United States Patent
Ruetz

(10) Patent No.: US 7,932,716 B2
(45) Date of Patent: Apr. 26, 2011

(54) ROTATION ANGLE SENSOR AND ROTATION ANGLE SENSOR SYSTEM

(75) Inventor: Christian Ruetz, Ludwigsburg (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 402 days.

(21) Appl. No.: 12/086,028

(22) PCT Filed: Sep. 30, 2006

(86) PCT No.: PCT/EP2006/009506
§ 371 (c)(1),
(2), (4) Date: Jun. 4, 2008

(87) PCT Pub. No.: WO2007/065496
PCT Pub. Date: Jun. 14, 2007

(65) Prior Publication Data
US 2009/0309583 A1 Dec. 17, 2009

(30) Foreign Application Priority Data

Nov. 12, 2005 (DE) .......... 10 2005 060 519
Apr. 25, 2006 (DE) .......... 10 2006 020 424

(51) Int. Cl.
*G01B 7/30* (2006.01)
(52) U.S. Cl. ............... 324/207.25; 73/514.31
(58) Field of Classification Search ......... 324/207.25; 73/514.31, 514.39
See application file for complete search history.

(56) References Cited

U.S. PATENT DOCUMENTS

| 5,657,006 A * | 8/1997 | Kinoshita et al. ........ 340/870.37 |
| 2004/0129869 A1 * | 7/2004 | Stridsberg ................ 250/231.13 |
| 2004/0232873 A1 * | 11/2004 | Heizmann et al. ............ 318/653 |

FOREIGN PATENT DOCUMENTS

| DE | 66 04 776 | 2/1970 |
| DE | 35 44 751 | 6/1987 |
| DE | 39 20 150 | 12/1989 |
| DE | 44 14 529 | 10/1994 |
| DE | 44 07 474 | 5/1996 |
| DE | 44 38 880 | 5/1996 |
| DE | 102 03 278 | 9/2002 |
| DE | 102 15 997 | 10/2002 |
| DE | 20 2004 010 921 | 10/2004 |
| EP | 1 467 187 | 10/2004 |
| WO | WO 2005/043074 | 5/2005 |

* cited by examiner

*Primary Examiner* — Bot L LeDynh
(74) *Attorney, Agent, or Firm* — Paul Vincent

(57) ABSTRACT

Rotation angle sensor and rotation angle sensor system for determining the angle of rotation of a shaft which can rotate at its shaft end, having a housing, having a shaft mount which is mounted on the housing such that it can rotate, having at least one signal transducer arranged on the shaft mount and having at least one signal receiver which is arranged on the housing and interacts with the signal transducer, wherein the shaft mount is designed in a manner such that the housing is attached only by means of the shaft mount at the shaft end.

18 Claims, 3 Drawing Sheets

ROTATION ANGLE SENSOR AND ROTATION ANGLE SENSOR SYSTEM

This application is the national stage of PCT/EP2006/009506 filed on Sep. 30, 2006 and also claims Paris Convention priority to DE 10 2005 060 519.2 filed Dec. 11, 2005 as well as DE 10 2006 020 424.7 filed Apr. 25, 2006.

BACKGROUND OF THE INVENTION

The invention concerns a rotation angle sensor for determining the rotation angle of a rotating shaft, at its shaft end.

Conventional rotation angle sensors at shaft ends have signal transducers arranged on the shaft side, the signals of which are received by signal receivers which are mounted in a rotationally secure fashion.

Such sensors have various disadvantages. For example, installation is difficult since the shaft end must be arranged in such a way that the signal transducers are precisely located in the detection area of the signal receivers in the final assembly position. If the signal transducers are not exactly aligned with the signal receivers, problems in sensor accuracy result. Moreover, it is unfavorable that sealing such rotation angle sensors is very difficult, since not only the space around the shaft end has to be sealed but also the space around the signal receivers.

The object of this invention is therefore to further develop a rotation angle sensor of the kind mentioned above in such a way that the stated disadvantages are avoided. In particular, a simple installation of the rotation angle sensor should be possible and its operational reliability should be increased.

SUMMARY OF THE INVENTION

This object is solved with a rotation angle sensor having a housing, with a shaft mount which is mounted on the housing such that it can rotate, and at least one signal transducer arranged on the shaft mount, wherein at least one signal receiver is arranged rotationally secure on the housing and interacts with the signal transducer, wherein the shaft mount is designed in such a manner that the housing is attached within the space only by means of the shaft mount at the shaft end.

By providing for a housing on which the shaft mount with the signal transducers as well as the signal receivers are arranged, an exact positioning of the signal transducers and signal receivers within the housing is possible. Axial and radial tolerances between the signal transducer and signal receiver are kept as small as possible. Precise positioning of the shaft compared to the rotation angle sensor is also possible because the housing is attached only by means of the shaft mount at the shaft end. Therefore, there are no separate components required for attaching the rotation angle sensor. This has the advantage that no undesirable tolerances or compounded tolerances occur which would lead to a suboptimal arrangement of the housing compared to the shaft end. The fact that the housing is attached only at the shaft end results in a very precise positioning of the shaft mount relative to the shaft end and thus of the signal transducer relative to the signal receiver. This increases the operational reliability of the rotation angle sensor.

Another advantage of the invention is that all sensor-relevant components are arranged within one housing. Such a rotation angle sensor can be pre-assembled at the sensor manufacturer and tested for its functional capability after the pre-assembly. The sensor can then be attached to the designated shaft end in a simple manner.

In order to prevent the housing from rotating along with the rotating shaft, the housing advantageously provides a rotation lock. The rotation lock can advantageously be supported by a component which is arranged stationary in that area. Such a component might be, for example, the housing of a larger unit, e.g. that of an electric motor, within which the rotation angle sensor according to the invention can be mounted. The rotation lock can be formed, for example, as a pin protruding from the housing of the rotation angle sensor, which engages in a stationary notch. For compensating axial tolerances, the notch can be formed as a pin holder extending in an axial direction so that a rotation lock is ensured even if the pin does not engage with the pin holder entirely, rather only partially. A rotation lock can also be achieved by an asymmetric weight distribution of the housing. This also ensures that the housing does not rotate with the rotating shaft due to the intrinsic weight of the housing.

In a further favorable version of the invention, the lock rotation lock may comprise an intermediate member which is arranged between the housing and the stationary component in such a way that parts thereof are movable relative to the housing in a direction of motion substantially perpendicular to the center-line of the shaft or the housing and that it is also movable relative to the stationary component in a second direction of motion preferably transverse to this first direction of motion. Due to provision of such an intermediate member it can be ensured that any tolerances or eccentricities the in the radial direction resulting from the rotation of the shaft are compensated for, without rotation of the housing and without any undesirable tensile or compression stress occurring at the stationary component and/or the housing. Taken altogether, this increases the measuring accuracy of the sensor.

In this regard, it is advantageous when the intermediate member is attached movably to the housing and/or the stationary component via a tongue and groove joint and/or a pin and slot hole joint. With tongue and groove joints allowing for at least partial movement of the intermediate member in the corresponding direction of motion, radial eccentricities can be compensated for in a suitable manner. The same applies for pin and slot hole joints providing for pins engaging with corresponding slot holes extending perpendicular to the shaft axis.

In order to secure the intermediate member at the housing and/or the stationary component in the axial direction, a corresponding tongue and groove joint can be provided for, which has T-grooves and complementary T-tongues. This, for example, permits the intermediate member to be securely pre-mounted to the housing in the axial direction. The intermediate member can provide pins in particular on the side facing the stationary component, which engage with slot holes extending horizontally to the grooves provided on the stationary component. The direction of motion of the intermediate member compared to the housing via the tongue and groove joint advantageously extends perpendicular to a direction of motion which can be provided for via the pin and slot hole joint between the intermediate member and the stationary component.

For a permanently secure fixing of the shaft mount to the shaft, the shaft mount can in particular be fixed to the shaft end via a press, glued, snap-in and/or screw joint.

A pivot bearing is advantageously arranged between the shaft mount and the housing for rotatable bearing of the shaft mount on the housing. Such a pivot bearing can, for example, be a rolling bearing such as a ball bearing, a grooved ball bearing or a slide bearing.

The shaft mount as such can advantageously be designed in such a way that it has a core section for the shaft end and a signal transducer mount section remote from the core section which is concentric thereto.

The signal transducer mount section can, in particular, define a circular space within which the signal transducer may be arranged. The signal transducer can, for example, be designed as a ring or disk which is then arranged in a correspondingly shaped signal transducer mount section.

The signal transducer can advantageously be designed as a magnetic element, in particular a ring or disk magnet. In such a version, the signal receiver is advantageously designed as a magnetic field sensor, in particular a Hall element. For the generation of signals in the opposite direction, there are in particular two magnetic field sensors provided which have phase-shifted analog output signals. The rotation angle of the shaft within one revolution can be determined in a conventional manner using these phase-shifted analog output signals.

In a further development with a signal transducer designed as magnetic element, the signal receiver and, in particular, a counter memory electrically connected to the signal receiver can be supplied with electric power by an induction coil which is arranged around a pulse wire. When the shaft mount rotates, an abrupt change in magnetization occurs in the pulse wire due to the magnetic element so that sufficient electric power for feeding the sensor or the cell memory is provided at the induction coil. With such a version, an incremental signal is generated from which the number of revolutions of the shaft can be determined. In the described version, the counter memory works self-sufficiently and independently of an exhaustible power source. In this context, the entire disclosure of DE 10 2004 062 448 is hereby incorporated by reference. The content of this German patent application is therefore also part of the content of this application. The pulse wire thereby preferably has a magnetically soft core and a magnetically hard sheath.

Further electric and electronic components required for the evaluation of the rotation angle can be supplied with power via the induction coil.

A further development of the invention provides two pulse wires with induction coils arranged crosswise as an extension of the rotation axis of the shaft. This is an arrangement with an especially high degree of efficiency and sufficient power can thereby be provided for supplying the signal receivers, a counter memory, or further electrical components required for signal evaluation.

The signal receiver is advantageously arranged on a printed circuit board located in the housing. The counter memory and an evaluation unit for determining the rotation angle of the shaft can also be arranged on this printed circuit board.

The housing of the rotation angle sensor is advantageously designed to be substantially rotationally-symmetric. Thus, an optimal arrangement of the individual components of the sensor can be achieved in a comparatively small installation space. It is also conceivable that the housing comprises a cover for a substantially tight sealing of the housing. This can increase the sensitivity of the sensor to environmental influences.

According to the invention, the signal receiver may be arranged separated from the signal transducer by a wall in an enclosed space in the housing. The signal receiver—which can in particular be arranged on a printed circuit board—as well as further components are thus safely protected from environmental influences.

In principle, the rotation angle sensor according to the invention can be used whenever the rotation angle of a shaft is to be determined. The rotation angle sensor can, in particular, be arranged at the free end of a steering shaft of a vehicle or at the motor shaft of an electric motor for driving a steering shaft of a vehicle. The rotation angle sensor can be arranged within the motor housing of an electric motor, in particular an electric motor for driving a steering shaft.

The above mentioned object is also achieved by a rotation angle sensor system comprising a rotation angle sensor according to the invention and a shaft end, wherein the housing of the rotation angle sensor is attached only by means of the shaft mount of the rotation angle sensor at the shaft end. As already mentioned, the shaft end can be attached to the shaft mount via, for example, press, glued, snap-in and/or screw joints.

BRIEF DESCRIPTION OF THE DRAWING

Further details and advantageous design variants of the invention are to be taken from the following description which describes and explains in detail the embodiment of the invention shown in the drawing.

DESCRIPTION OF THE PREFERRED EMBODIMENT

Figure 1:
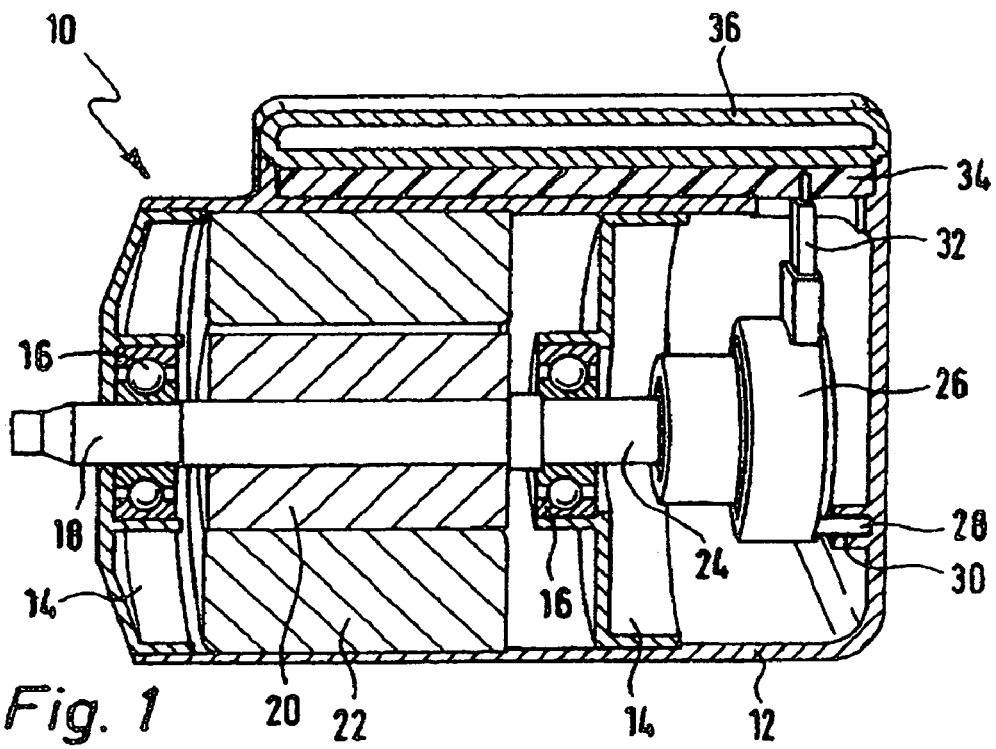
FIG. 1 shows a longitudinal cut through an electric motor comprising a rotation angle sensor according to the invention.

FIG. 1 shows a longitudinal cut through an electric motor 10. The electric motor 10 comprises a motor housing 12 at which two end shields 14 are arranged. The two end shields 14 carry the shaft 18 of the electric motor 10 via the bearings 16. The rotor 20 of the electric motor is arranged on the shaft 18, between the two bearings 16, the stator 22 is provided on the housing 12 on the housing side, opposite to the rotor 20.

A rotation angle sensor 26 is attached to the shaft end 24 of the shaft 18 inside the housing 12. The rotation angle sensor 26 is supported by the housing 12 against rotation via a pin-type lock 28. The housing 12 thereby provides a pin holder 30 extending in axial direction.

In the design variant shown in FIG. 1, the rotation angle sensor 26 is electrically connected to a motor board 34 via electrical contacts 32. The motor board 34 provides electric and electronic components for driving the electric motor 10 (not shown in the figures). The motor board 34 is covered by a removable housing cover 36.

The electric motor 10 can, in particular, be used in an electromechanic steering of a vehicle. Via the shaft 18, it is possible, for example, to drive a steering shaft either directly or by interconnecting a transmission.

The exact rotation angle of the shaft 18 can be determined using the rotation angle sensor 26. As clearly shown in the section of FIG. 2 and the representation shown in FIG. 3, the rotation angle sensor 26 has its own housing 38 at which a rotatable shaft mount 42 is arranged via a bearing 40. The shaft mount 42 has a core section 44 on the side facing the shaft, on which the shaft end 24 is fixed in a rotationally secure fashion. In particular, a press, glued, snap-in and/or screw joint can be provided for attaching the shaft end 24 to the shaft mount 44. The arrangement of the rotation angle sensor 26 at the shaft end 24 is such that the rotation angle sensor 26 is attached only at the shaft end. The rotation angle sensor 26 is therefore not disposed on the housing 12 of the electric motor or at any other stationary component. The contacts 32 and the rotation lock 28 are not provided for mounting the rotation angle sensor 26 to the electric motor 10.

Figure 2:
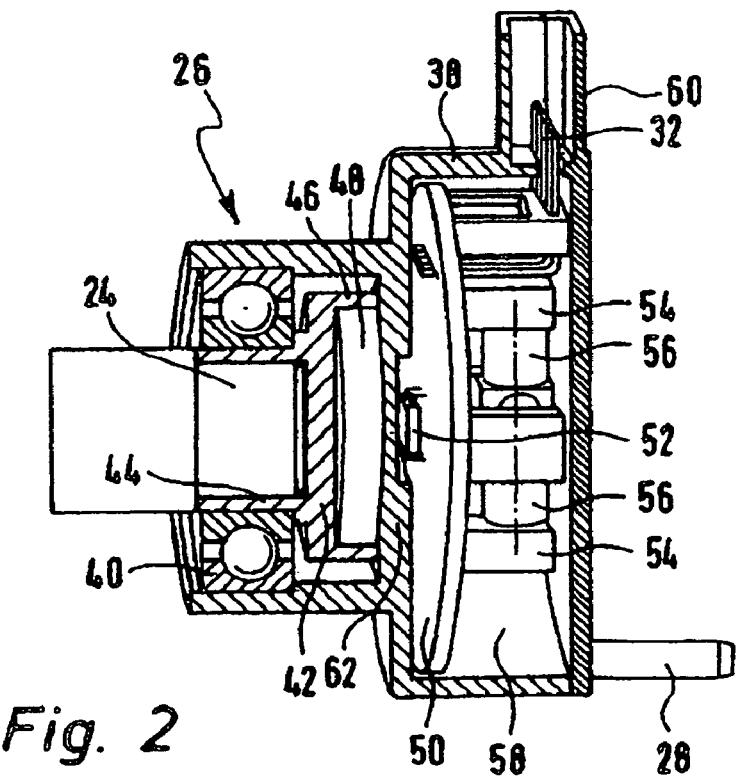
FIG. 2 shows a longitudinal cut through the rotation angle sensor according to FIG. 1.

As FIG. 2 also clearly shows, the shaft mount 42 has a signal transducer section 46 on the side remote from the core section 44. The circular signal transducer section 46 holds a signal transducer 48 designed as disk magnet. Due to the fixed connection between the shaft end 24 and the shaft mount 42, the signal transducer 48 is rotationally coupled with the shaft 18.

A double magnetic field sensor 52 is arranged on a sensor board 50 in the housing 38. When the shaft 18 or the signal transducer 48 rotates, phase-shifted output signals are generated at the double magnetic field sensor 52, which are evaluated by an evaluation electronics also provided on the sensor board 50. The rotation angle of the shaft 18 within one revolution or one rotation section can be determined from these signals. Two pulse wires arranged crosswise and embedded in the coil bodies 54 are provided on the side of the sensor board 50 remote from the magnetic field sensor 52 and also remote from the signal transducer 48. Induction coils 56 are arranged on the coil bodies 54 in such a way that, when the magnetic field changes due to the rotation of the signal transducer 48, an abrupt change in magnetization occurs in the pulse wires and power is provided at the induction coil. This power is used for operating a counter memory disposed on the sensor board 50. The number of revolutions of the shaft 18 or the number of rotation angle sections of the shaft 18 can be determined with that counter memory. The magnetic signal transducer 48 can be used as incremental encoder: each time a signal transducer is reset, a signal is output to the counter memory. The magnetic signal transducer and the pulse wires together with the coil bodies 54 and coils 56 can be designed in such a way that sufficient power is provided for supplying all electrical components on the sensor board 50. The result is a rotation angle sensor which works self-sufficiently.

As clearly shown in the figures, the two coil bodies 54 and the pulse wires located inside cross each other on the center-line of the shaft 18 or the disk magnet 48.

Figure 3:
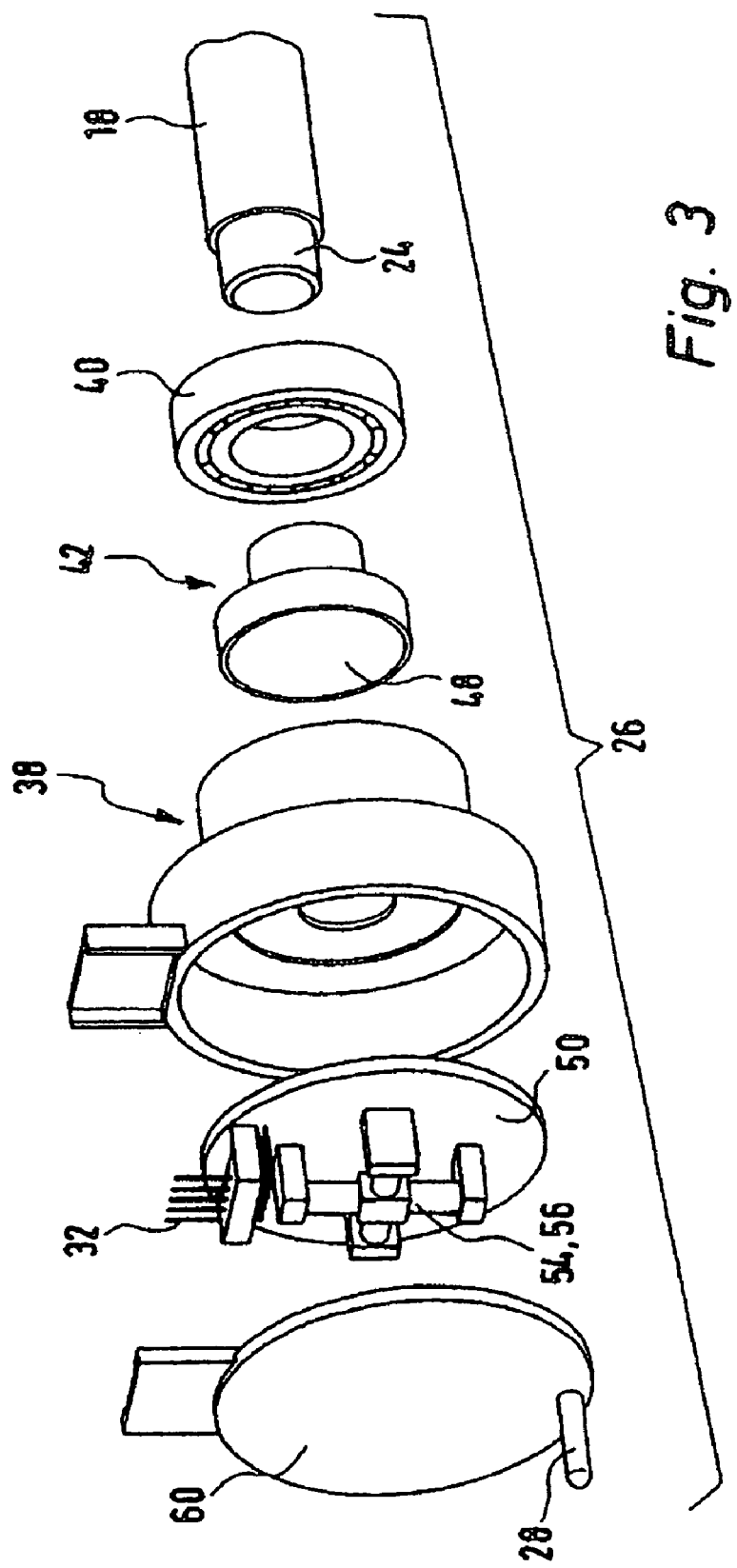
FIG. 3 shows an exploded view of the rotation angle sensor according to FIGS. 1 and 2.

As clearly shown, in particular in FIGS. 2 and 3, the sensor board 50 is arranged in an enclosed space 58 separated from the shaft mount 42. The space 58 can be sealed tightly with a sensor cover 60. This is to protect the sensor board 50, including the electronics in the housing 38 of the rotation angle sensor, from environmental influences. The signals coming from the magnetic signal transducer in the form of changing magnetic fields due to the shaft rotation penetrate the closed wall 62 provided between the signal transducer 48 and the signal receiver 52.

The rotation angle sensor 26 can be mounted in the following way: The sensor is first mounted to the shaft end 24. The rotation lock 28 is then inserted into the respective pin holder 30 on the housing 12. The rotation angle sensor is then electrically contacted with the motor board 34 via the contacts 32. It is, of course, conceivable that the electrical contacts can also be arranged parallel to the center-line of the shaft mount 42. The advantage of that is that a contacting of the sensor with a corresponding board can be carried out simultaneously with the insertion of the rotation lock 28 into the pin holder 30. One working step is thereby omitted.

Figure 4:
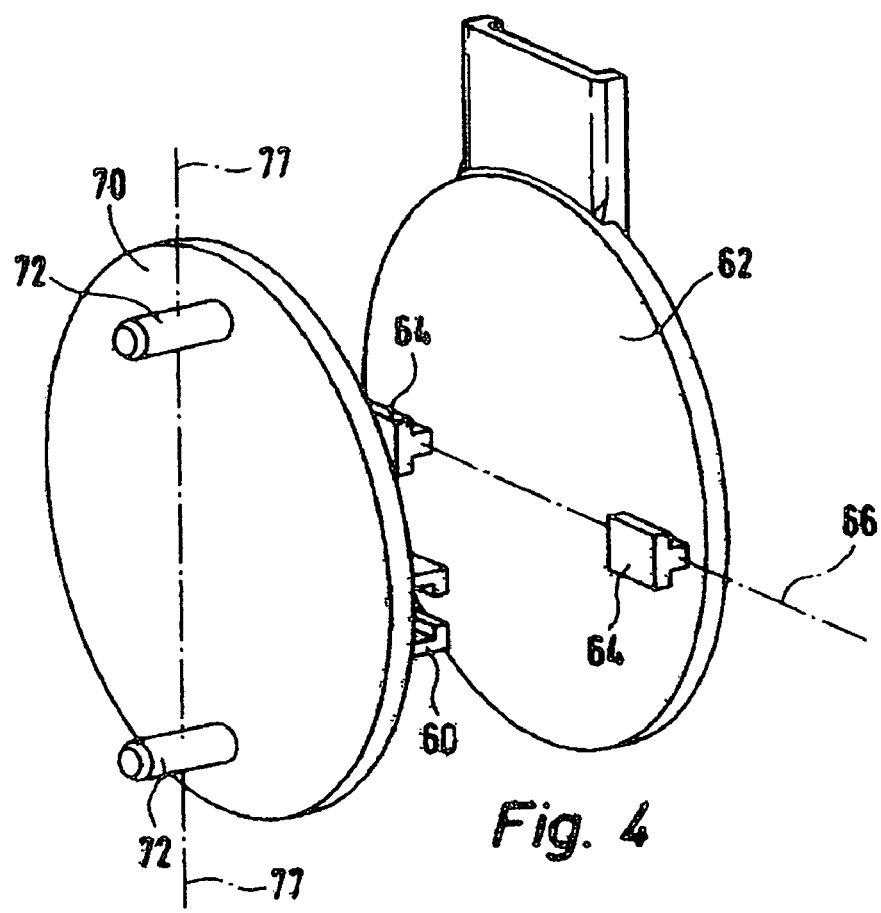
FIG. 4 shows the sensor cover and an intermediate member for the arrangement on the sensor cover in perspective view from one side.
Figure 5:
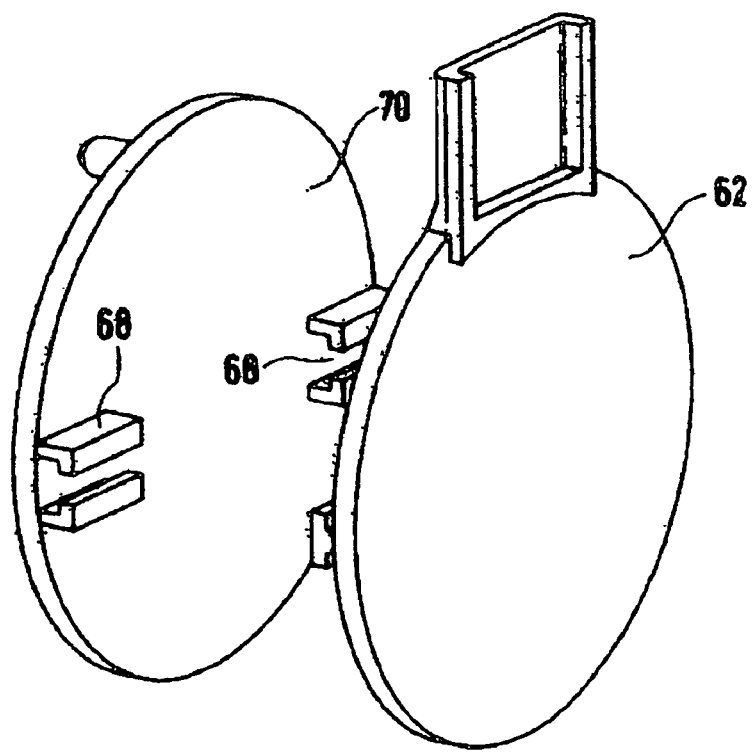
FIG. 5 shows the sensor cover together with the intermediate member according to FIG. 4 in perspective view from the other side.

FIGS. 4 and 5 show a sensor cover 62 which can be used instead of the sensor cover shown in FIGS. 1 to 3. As clearly shown in FIG. 4, the sensor cover 60 has outer tongues 64 with a T-shaped cross-section, which are arranged along a direction 66 running perpendicular to the shaft 18.

In the assembled state, the tongues 64 are located in the T-grooves 68 provided therefor which are arranged on an intermediate member 70. When the tongues 64 are inserted in the T-grooves 68, the cover 62 and thus the entire sensor 26 can be at least partially moved relative to the intermediate member 70 in the direction 66.

On the side remote from the cover 62, the intermediate member 70 has two pins 72 arranged along a direction 77 running transverse to the direction 66.

In the assembled state, the two pins 72 engage with corresponding slot holes in the pin holder 30 provided on the housing 12 (see FIG. 1). The slot holes provided for holding the pins 72 advantageously have a width corresponding to the diameter of the pins 72 or only slightly larger. The slot holes run, at least in parts, in the direction 77 so that the intermediate member 70 is movable relative to the housing 12, at least in parts, in the direction 77.

With a design variant as described in the FIGS. 4 and 5, motion compensation of the sensor cover 62 in the radial direction is therefore possible without requiring rotation of the sensor cover 62 along with the rotating shaft 18. This increases the measuring accuracy of the sensor 26.

The intermediate member 70 can be located in a pre-assembly position on the sensor cover 62 due to the provision of the T-groove joint. Due to the pins 72 extending sufficiently far in the axial direction engaging with slot holes designed correspondingly deep, a certain play occurring in the axial direction can be compensated for. A particular advantage of the design variant of the invention shown in the figures is that the signal transducer and signal receiver are fixed relative to each other within the sensor 26 and form an enclosed system. Due to the arrangement of the corresponding components in the same housing, there are very few compounded tolerances. This therefore results in very high operational reliability and measuring accuracy of the sensor. Due to the attachment of the rotation angle sensor 26 at the shaft end 24, the arrangement of the rotation angle sensor 26 within the space does not depend on other components such as, for example, the housing 12 of the electric motor 10. This also results in a very high operational accuracy of the sensor 26.

I claim:

1. A rotation angle sensor for determining a rotation angle of a rotating shaft at a shaft end thereof, the rotating shaft borne in a first housing and supported by a first bearing disposed between and cooperating with the first housing and the shaft to permit rotation of the shaft relative to the first housing, the sensor comprising:
   a second housing;
   a shaft mount disposed in said second housing, said shaft mount structured and dimensioned for mounting on the shaft end;
   a second bearing disposed between and cooperating with said second housing and said shaft mount to permit rotation of said shaft mount relative to said second housing;
   at least one signal transducer disposed on said shaft mount; and
   at least one signal receiver disposed in said second housing and communicating with said signal transducer, wherein said second housing is attached only by means of said shaft mount at the shaft end.

2. The sensor of claim 1, wherein said second housing comprises a rotation lock.

3. The sensor of claim 2, wherein said rotation lock is disposed, structured and dimensioned to cooperate with a stationary component disposed on the first housing.

4. The sensor of claim 2, wherein said rotation lock comprises an asymmetric weight distribution of said second housing.

5. The sensor of claim 3, wherein said rotation lock comprises an intermediate member which is disposed between said second housing and the stationary component for displacement relative to said second housing in a direction of motion substantially perpendicular to a center-line of said second housing and such that it is movable relative to the stationary component in a second direction of motion substantially transverse to said first direction of motion.

6. The sensor of claim 5, wherein said intermediate member is attached to said second housing and/or to the stationary component via a tongue and groove joint and/or a pin and slot hole joint.

7. The sensor of claim 6, wherein said tongue and groove joint has T-grooves and complementary T-tongues.

8. The sensor of claim 1, wherein said shaft mount is attached to the shaft end via press, glued, snap-in and/or screw connection.

9. The sensor of claim 1, wherein said shaft mount has a core section for the shaft end and a signal transducer mount section remote from said core section.

10. The sensor of claim 1, wherein said signal transducer comprises a magnetic element and/or said signal receiver comprises a magnetic field sensor.

11. The sensor of claim 1, wherein said signal transducer comprises a magnetic element and said signal receiver and/or a counter memory electrically connected to said signal receiver is supplied with electric power by an induction coil which is arranged around a pulse wire, wherein, when said shaft mount and said magnetic element rotate, an abrupt change in magnetization occurs in said pulse wire due to a changing magnetic field, wherein sufficient electric power for operating a counter memory is generated by said induction coil.

12. The sensor of claim 11, wherein two pulse wires with induction coils are disposed crosswise in extension of a rotation axis of the shaft.

13. The sensor of claim 1, wherein said signal receiver is mounted to a printed circuit board disposed in said second housing.

14. The sensor of claim 13, wherein an evaluation unit for determining the rotation angle of the shaft is disposed on said printed circuit board.

15. The sensor of claim 1, wherein said second housing is substantially rotationally-symmetric and/or comprises a cover for substantially tight sealing thereof.

16. The sensor of claim 1, wherein said signal receiver is separated from said signal transducer by a wall of an enclosed space within said second housing.

17. The sensor of claim 1, wherein the rotation angle sensor is structured and dimensioned to be arranged within a motor housing of an electric motor.

18. A rotation angle sensor system comprising the rotation angle sensor of claim 1.

* * * * *